United States Patent
Juhasz et al.

(10) Patent No.: US 9,625,600 B2
(45) Date of Patent: Apr. 18, 2017

(54) SYSTEMS AND METHODS FOR REMOVAL OF SWELL NOISE IN MARINE ELECTROMAGNETIC SURVEYS

(71) Applicant: PGS Geophysical AS, Oslo (NO)

(72) Inventors: Robert Juhasz, Stockholm (SE); Peter Lindqvist, Segeltorp (SE)

(73) Assignee: PGS Geophysical AS, Oslo (NO)

( * ) Notice: Subject to any disclaimer, the term of this patent is extended or adjusted under 35 U.S.C. 154(b) by 1170 days.

(21) Appl. No.: 13/705,017

(22) Filed: Dec. 4, 2012

(65) Prior Publication Data
US 2014/0153363 A1  Jun. 5, 2014

(51) Int. Cl.
*G01V 1/38* (2006.01)
*G01V 3/08* (2006.01)
*G01V 3/15* (2006.01)
*G01V 3/38* (2006.01)

(52) U.S. Cl.
CPC ............ *G01V 3/083* (2013.01); *G01V 3/15* (2013.01); *G01V 3/38* (2013.01); *G01V 2003/086* (2013.01)

(58) Field of Classification Search
None
See application file for complete search history.

(56) References Cited

U.S. PATENT DOCUMENTS

| | | | |
|---|---|---|---|
| 4,617,518 A | 10/1986 | Srnka | |
| 7,671,598 B2 | 3/2010 | Ronaess et al. | |
| 7,679,991 B2 | 3/2010 | Ferber | |
| 7,737,698 B2 | 6/2010 | Tenghamn et al. | |
| RE41,656 E * | 9/2010 | Robertsson | G01V 1/364 367/24 |
| 7,800,977 B2 | 9/2010 | Grion | |
| 8,077,543 B2 * | 12/2011 | van Manen | G01V 1/36 367/21 |
| 8,274,288 B2 | 9/2012 | Ziolkowski et al. | |
| 8,531,912 B2 * | 9/2013 | Soubaras | G01V 1/3826 367/15 |

(Continued)

FOREIGN PATENT DOCUMENTS

| | | |
|---|---|---|
| WO | 2009062236 A1 | 5/2009 |
| WO | 2011008106 A1 | 1/2011 |

OTHER PUBLICATIONS

Staff Report, "2014 Meritorious Awards for Engineering Innovation", WWW.epmag.com/item/print/2014-Meritorious-Awards-Engineering-Innovation-132699, May 1, 2014, see p. 8, 12 pages total.

(Continued)

Primary Examiner — Tung Lau

(57) ABSTRACT

Methods and systems for determining and removing swell noise from electric field data collected from streamers towed at different are disclosed. In one aspect, a first set of streamers called upper streamers is towed at a shallow depth, and the second set of streamers called lower streamers is towed below the upper streamers. Receivers located along the streamers measure surrounding electric fields and produce electric field signals. A proportionality parameter is calculated as a function of the electric field signals generated by vertically aligned receivers. The proportionality parameter can be used to calculate an approximate swell noise that is used to remove swell noise from electric field data measured by the receivers.

27 Claims, 9 Drawing Sheets

(56) References Cited

U.S. PATENT DOCUMENTS

| | | |
|---|---|---|
| 2010/0045296 A1 | 2/2010 | Tenghamn |
| 2011/0279120 A1 | 11/2011 | Sudow et al. |
| 2012/0051175 A1 | 3/2012 | Sudow et al. |
| 2012/0236684 A1 | 9/2012 | Juhasz et al. |
| 2012/0250456 A1 | 10/2012 | Tenghamn |

OTHER PUBLICATIONS

United Kingdom Search Report mailed on Feb. 20, 2014, in the prosecution of patent application No. GB1321229.5, 3 pages.

Johan Mattsson, et al., "Error Analysis and Capability Modelling for Towed Streamer Electromagnetics," First Break, Aug. 2012, pp. 91-96, vol. 30.

Johan Mattsson, et al., "Towed Streamer EM: The Challenges of Sensitivity and Anisotropy" First Break, Jun. 2013, pp. 155-159, vol. 31.

Chris Anderson, et al., "An Integrated Approach to Marine Electromagnetic Surveying Using a Towed Streamer and Source" First Break, May 2010, pp. 71-75, vol. 28.

Lezaeta, Pamela F., et al., "Correction of shallow-water electromagnetic data for noise induced by instrument motion", Geophysics, vol. 70, No. 5, Sep.-Oct. 2005, pp. G127-G133.

Moldoveanu, Nick et al., "Over/under towed-streamer acquisition: A method to extend seismic bandwidth to both higher and lower frequencies", The Leading Edge, Jan. 2007, pp. 41-58.

Kragh, E., et al., "Increasing Resolution with a New Method for Efficient broadband Marine Acquisition and Processing", Hyderabad 2010, pp. 1-4.

\* cited by examiner

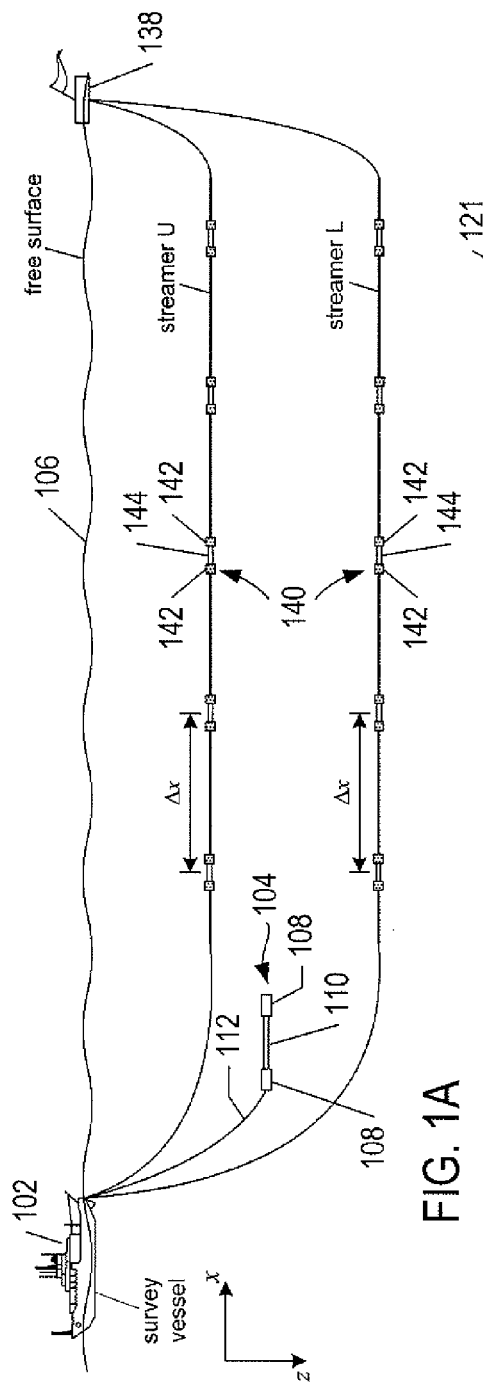
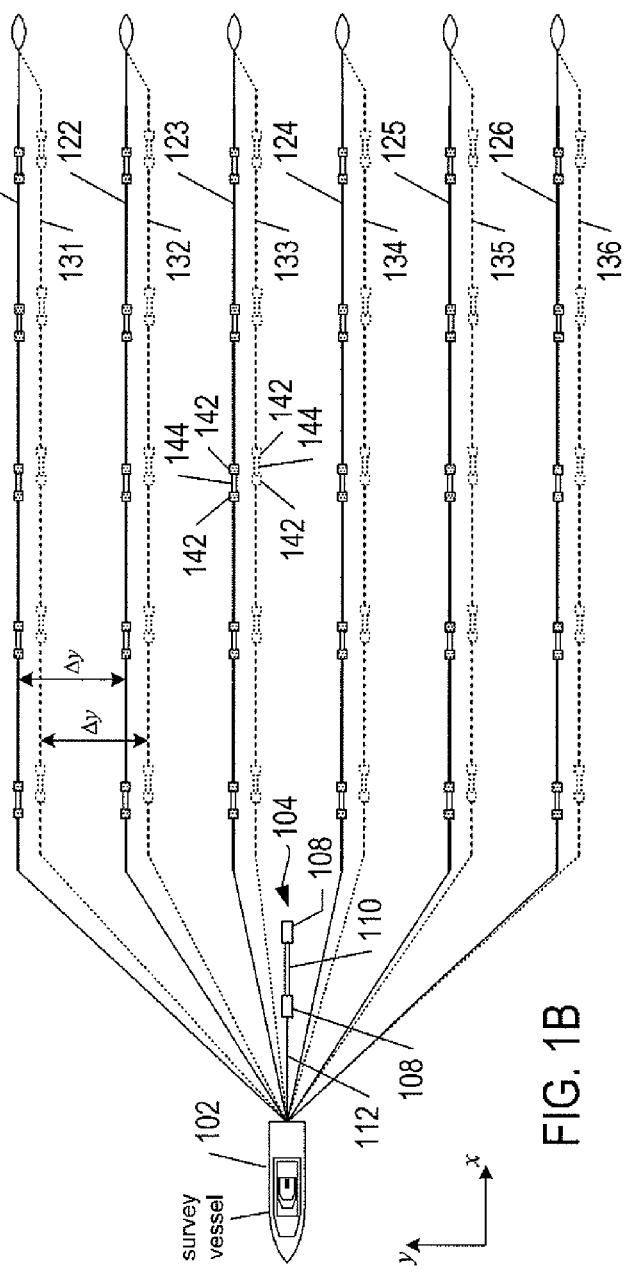

SYSTEMS AND METHODS FOR REMOVAL OF SWELL NOISE IN MARINE ELECTROMAGNETIC SURVEYS

BACKGROUND

Marine electromagnetic ("EM") survey technology has been commercially used for locating hydrocarbon-rich subterranean features for less than 15 years. EM survey techniques typically employ generation of primary time-varying electromagnetic fields using dipole antennas. The primary time-varying electromagnetic field extends downward into the subterranean environment where it induces secondary currents. The induced secondary currents, in turn, generate a secondary time-varying electromagnetic field that is sensed, at various locations distributed across a relatively large area, in order to detect non-uniformities in the secondary electromagnetic field resulting from non-uniform electrical resistance in various features within the subterranean environment. Hydrocarbons and hydrocarbon-saturated rocks and sediments have much higher resistivities than water and water-saturated rocks and sediments. High-resistance subterranean pooled hydrocarbons and hydrocarbon-saturated rocks and sediments result in a non-uniform distribution of secondary current paths and concentration of electrical field lines in conductive portions of the subterranean environment above the pooled hydrocarbons and hydrocarbon-saturated rocks and sediments. By taking multiple measurements across a wide area for each of many different dipole-antenna transmitter locations, digitally encoded data sets are generated and stored in data-storage systems, which are subsequently computationally processed in order to provide indications of the longitudinal and latitudinal positions and depths of potential hydrocarbon-rich subterranean features. In many cases, three-dimensional plots, maps, or images, of the subterranean environment are generated as a result of these data-processing operations. The maps and images produced from EM-survey data can be used alone or in combination with maps and images produced by other methods, including marine exploration geophysical methods, to locate subterranean hydrocarbon sources prior to undertaking the expense of marine-drilling operations to recover liquid hydrocarbon from subterranean sources.

Because EM surveys have traditionally been conducted near the surface of an open body of water, such as an ocean, sea, or lake, the EM-survey data is often impacted by conditions at the water surface. For instance, swell noise can be a significant problem in offshore EM surveys. Swell noise results from swells, which are a series of surface waves that are not generated by a local wind and are often created by storms located hundreds or thousands of nautical miles away from the beach where they break. Because swells have dispersed from their source, swells typically have a longer wavelength than wind generated waves and have a narrower range of frequencies and directions than wind generated waves. As a result, swell noise is a high amplitude noise that can affect a number of neighboring traces and is often observed in geophysical images (e.g., seismic images) as vertical stripes or "blobs." Those working in the petroleum industry continue to seek computational systems and methods that reduce swell noise in geophysical data used to create geophysical images created from EM surveys.

DESCRIPTION OF THE DRAWINGS

FIGS. 1A-1B show a side-elevation view and a top view, respectively, of a marine electromagnetic surveying system.

DETAILED DESCRIPTION

Figure 2:
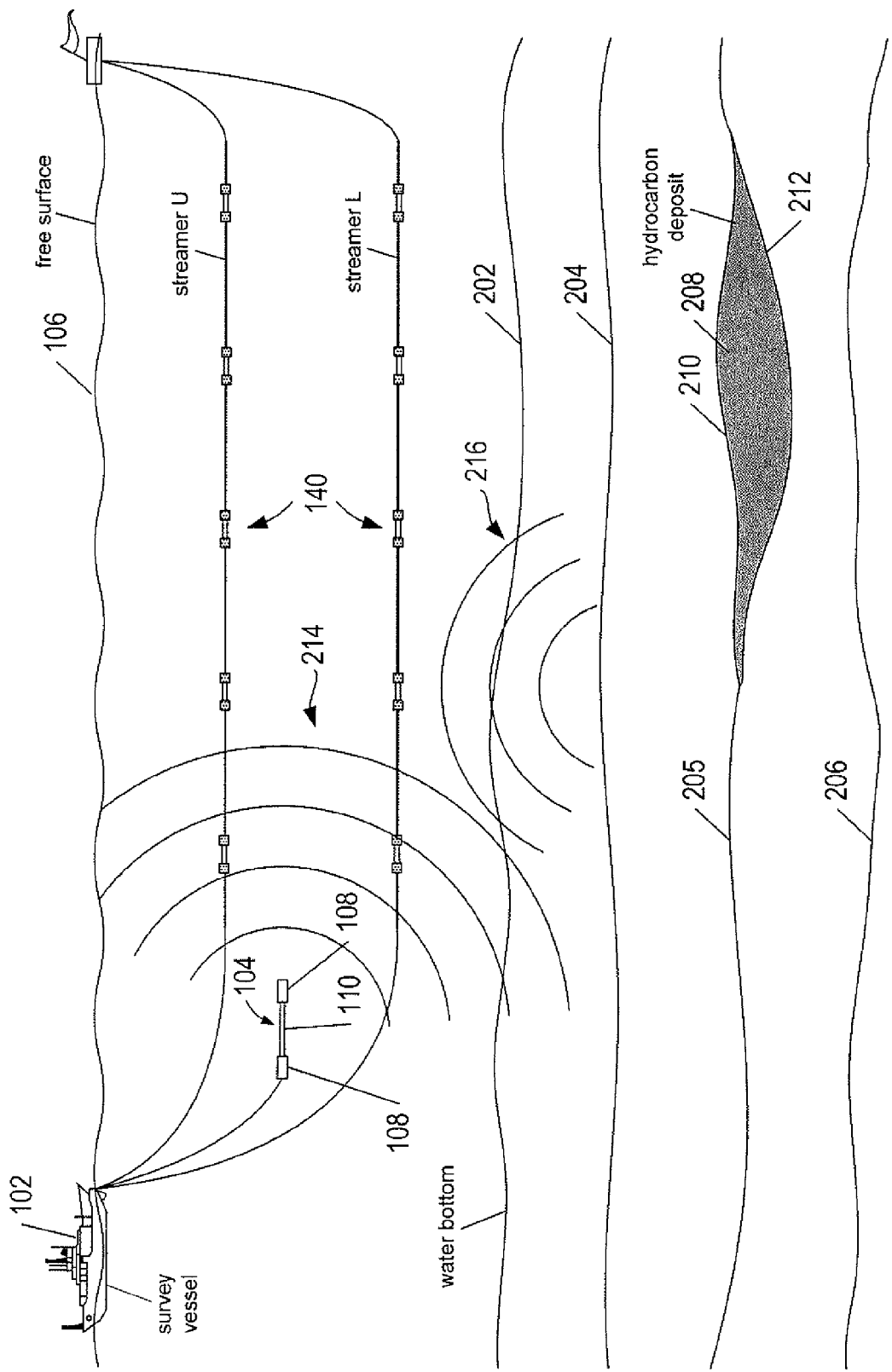
FIG. 2 shows a side elevation view of a survey vessel, dipole source, and upper and lower streamers towed above a subterranean formation.

Methods and systems for determining swell noise and removing swell noise from electromagnetic ("EM") field data collected from streamers towed at different depths by a survey vessel are disclosed. In one aspect of the following description, a first set of streamers called upper streamers is towed at a shallow depth, while a second set of streamers called lower streamers is towed below the upper streamers. Receivers located along the streamers measure surrounding EM fields and produce EM field signals. A proportionality parameter is calculated as a function of the EM field signals generated by vertically aligned receivers. The proportionality parameter can be used to calculate an approximate swell noise that is used to remove swell noise from EM field data measured by the receivers.

FIGS. 1A-1B show a side-elevation view and a top view, respectively, of a marine electromagnetic ("EM") surveying system. In FIG. 1A, a survey vessel 102 is shown towing an electric dipole source 104 below a free surface 106 of a body of water. The body of water can be a region of an ocean, a sea, a lake, or a river. The source 104 includes two source electrodes 108 located at opposite ends of a cable 110, which is connected to the survey vessel via a source cable 112. In the example of FIG. 1A-1B, the source electrodes 108 and the cable 110 form a long horizontally oriented electric dipole transmission antenna 104. The source 104, shown in FIGS. 1A-1B, is not intended to be limited to a horizontal arrangement of the cable and electrodes 108. The cable 110 may also include, in addition to or in substitution of the horizontally oriented source 104, any one or more of a vertical electric dipole antenna, and horizontal or vertical magnetic dipole antenna (current loop).

In FIGS. 1A and 1B, the survey vessel 102 also tows two sets of streamers that are located at different depths below the free surface 106. In FIG. 1A, an upper streamer U connected to the survey vessel 102 represents any one of a first set of streamers 121-126, shown in FIG. 1B, that are towed at approximately the same depth above the source 104, and a lower streamer L connected to the survey vessel 102 belongs to a second set of streamers 131-136, shown in FIG. 1B, that are towed at approximately the same depth below the source 104. Each upper streamer has a corresponding lower streamer, and the corresponding upper and lower streamers are connected to the same buoy, such as buoy 138, in order for the streamers to maintain a horizontal orientation as the streamers are towed through the body of water. As shown in the example of FIG. 1B, the first set of streamers 121-126 ideally forms an upper planar horizontal data acquisition surface and the second set of streamers 131-136 also ideally forms a lower planar horizontal data acquisition surface with the streamers in the upper and lower data acquisition surfaces separated by the same distance $\Delta y$. Each streamer in the upper acquisition surface is located above a corresponding streamer in the lower acquisition surface in the z-direction. For example, the streamer U is ideally located above the corresponding streamer L. In some instances, the source 104 may be towed by a separate vessel. Likewise, one or more of the streamers may be towed by a separate vessel, such as a submergible remotely operated vessel ("ROV"). In some embodiments, at least one of the streamers may not be connected to a buoy 138. For example, one or more lateral force and depth control devices may be utilized to maintain the horizontal orientation of the streamer.

In the example of FIGS. 1A and 1B, each of the streamers in the upper and lower data acquisition surfaces includes five receivers 140 that are spaced-apart by a distance $\Delta x_i$ in the x-direction, and each receiver in an upper streamer has a corresponding receiver in a lower streamer as the streamers are towed through a body of water. In other words, while the upper and lower streamers are towed through a body of water, each receiver in an upper streamer has a corresponding receiver in a lower streamer that is located some distance $\Delta z$ in the z-direction beneath the receiver in the upper streamer. A receiver in an upper streamer is said to be vertically aligned, or aligned in the z-direction, with a corresponding receiver in a lower streamer when the receiver in the upper streamer has coordinates (x, y, z) and the receiver in the lower streamer has coordinates (x, y, z+$\Delta z$). Each receiver is composed of a pair of electrodes separated by a conductive element. For example, the receivers 140 include a pair of electrodes 142 separated by a conductive element 144. The number of receivers located along any streamer is not intended to be limited to simply five receivers. In practice, the number of receivers located along a streamer in either an upper or a lower data acquisition surface can range from as few as one receiver to more than five receivers provided the number of receivers along corresponding upper and lower streamers are the same and receivers in the upper and lower streamers have substantially the same spacing. The upper and lower data acquisition surfaces are not limited to having six streamers. In practice, the number of streamers in the upper and lower data acquisition surfaces may range from a single streamer in each data acquisition surface to more than six streamers in each of the acquisition surfaces provided the upper and lower data acquisition surfaces have the same number of corresponding streamers and receivers that are approximately aligned in the z-direction. In some embodiments, one or more of the streamers may be towed with a depth profile that is at an angle to free surface 106, provided the upper and lower data acquisition surfaces have corresponding streamers and receivers that are approximately aligned in the z-direction.

The source 104 can be anywhere from approximately 50 to 300 meters long or longer and is generally towed, in certain types of EM data-collection methods, at a depth of approximately 5 to 100 meters below the free surface 106. The lower streamers are towed at a lower depth of approximately 50 to 500 meters below the free surface 106, and the upper streamers are towed at a shallower depth of approximately 10 to 50 meters below the free surface 106.

Ideally, the upper and lower data acquisition surfaces form a three-dimensional data acquisition volume with the receivers aligned in the x, y, and z directions. In practice, however, the data acquisition surfaces are smoothly varying due to active sea currents and weather conditions. In particular, the towed streamers may independently undulate as a result of dynamic conditions of the body of water. As a result, corresponding streamers and receivers in the upper and lower data acquisition surfaces may be only approximately vertically aligned.

FIG. 2 shows a side elevation view of the survey vessel 102, source 104, and upper and lower streamers U and L towed above a subterranean formation. Curve 202 represents a water bottom of a body of water located above the subterranean formation. The subterranean formation is composed of a number of subterranean layers of sediment and rock. Curves 204-206 represent interfaces between subterranean layers of different compositions. A shaded region 208, bounded at the top by a curve 210 and at the bottom by a curve 212, represents a hydrocarbon-rich subterranean deposit, the depth and positional coordinates of which may be determined by analysis of data collected during a EM survey.

An EM survey is carried out by transmitting time-varying electrical currents between the electrodes 108 of the source 104. The time-varying currents, of magnitudes generally from hundreds to thousands of amperes, generate an EM field that radiates outward from the source 104 as a primary electromagnetic field, represented by curves 214, that passes from the source 104 into the body of water and into the subterranean formation. In certain EM methods, the transmission currents have binary wave forms with a fundamental frequency of approximately 0.1 to approximately 0.25 Hz. The primary electromagnetic fields generate secondary, subterranean electric currents that, in turn, produce a secondary electromagnetic field, represented by curves 216, that is radiated back into the body of water. In other techniques, including inductively coupled time-domain EM, the transmission current is steadily ramped up to a relatively high, steady-on current value and then rapidly extinguished, leading to an electromotive force ("emf") impulse that generates secondary electromagnetic eddy currents in the subterranean formation which decay via Ohmic dissipation and produce weak, relatively short-lived secondary magnetic fields. The receivers 140 record the magnitude of the primary and secondary electromagnetic field strength and may additionally record phases of the secondary electromagnetic fields generated by the primary, time-varying electromagnetic field output from the source 104. Because the receivers are towed behind the moving survey vessel and continuously recording data, the positions of the receivers are also continuously recorded along with receiver output that reflects the instantaneous magnitude and phase of the electromagnetic field at the current sensor position. The EM data can be processed to produce electrical-conductivity-based, three-dimensional maps of the subterranean formation.

As illustrated, each receiver measures an electric field of the primary and secondary electromagnetic fields. It is also possible to use magnetometers to measure magnetic components of the primary and secondary electromagnetic fields. However, the components measured by the upper and lower receivers typically contain noise produced by different noise sources. A first source of noise in the measured electric field is mechanical noise that results from streamer movement and/or movement of the survey vessel 102. Mechanical noise can be filtered from electric field data using data collected from accelerometers, magnetometers and other motion sensors located in the streamer and the survey vessel. On the other hand, a second source of noise in the measured electric field is swell noise also referred to as electrical noise. Swell noise results from the swells that move electrically charged particles in the water around the streamers. Swells typically have a long, very low frequency at the free surface. Swell noise decreases with depth so that the magnitude of the swell noise at the lower streamer L is smaller than the magnitude of the swell noise measured at the upper streamer U.

Figure 3:
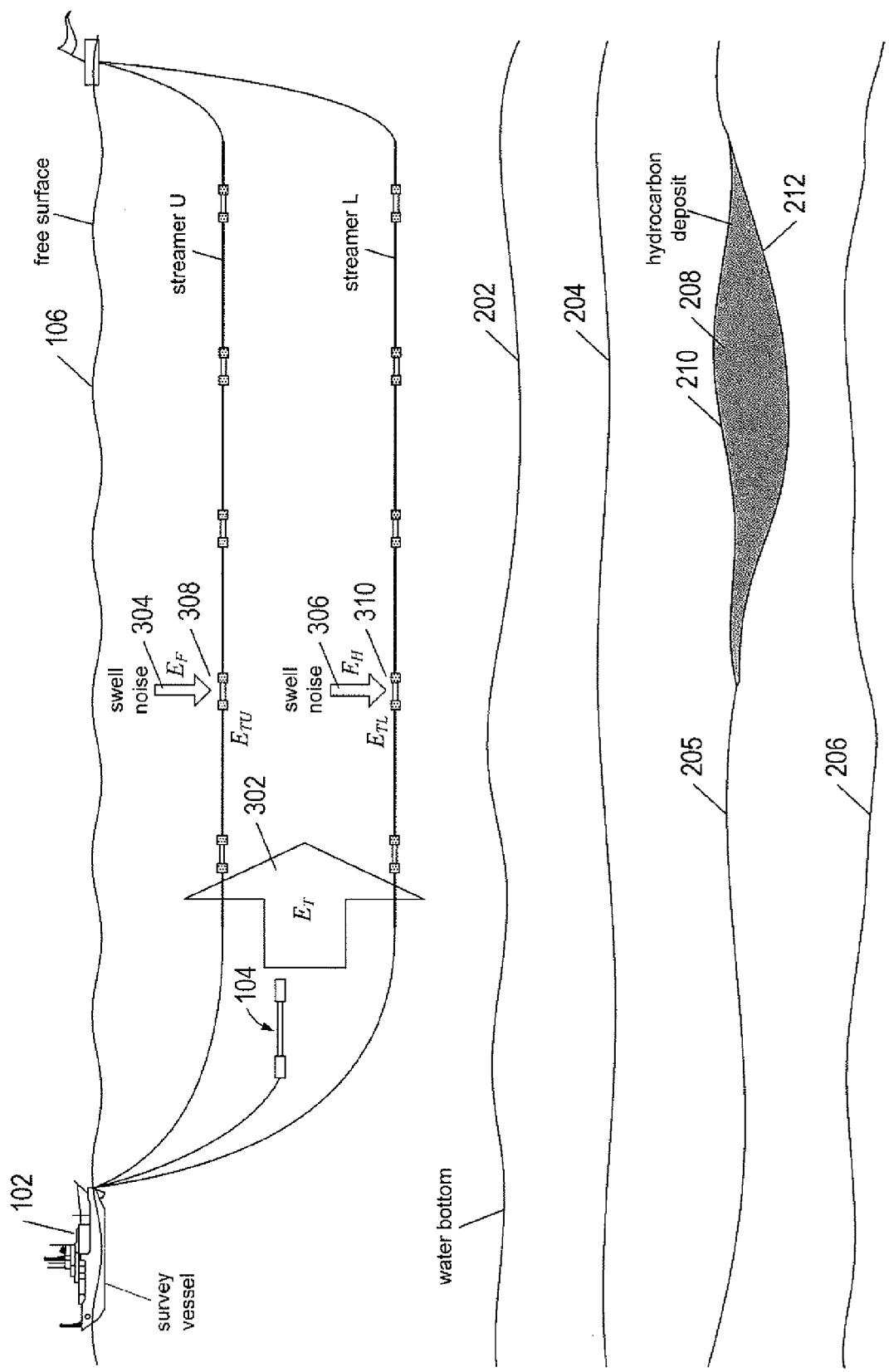
FIG. 3 shows a side-elevation view of upper and lower streamers and a representation of an electric field measured at vertically aligned receivers.

Because techniques already exist for filtering mechanical noise from the measured electric fields, computational methods for removal of swell noise contributions to the electric field of the primary electromagnetic field are now described. FIG. 3 shows a side-elevation view of the upper and lower streamers U and L and a representation of electric field measured at vertically aligned receivers. Directional arrow 302 represents the electric field, $E_T$, of the primary electromagnetic field output from the source 104, and directional arrows 304 and 306 represent the swell noise measured by vertically aligned upper receiver 308 and lower receiver 310. When only the electric fields produced by swells are considered, the amplitude of the electric field measured at the upper receiver 308 is given by:

$$E_U = E_{TU} + E_F \quad (1)$$

and the amplitude of the electric field measured at the lower receiver 310 is given by:

$$E_L = E_{TL} + E_H \quad (2)$$

where
$E_{TU}$ is the electric field 302 of the primary electromagnetic field measured at the upper receiver 308,
$E_{TL}$ is the electric field 302 of the primary electromagnetic field measured at the lower receiver 310,
$E_F$ is the swell noise 304 measured at the upper receiver 308, and
$E_H$ is the swell noise 306 measured at the lower receiver 310.

Equations (1) and (2) present two equations for the measured electric fields $E_U$ and $E_L$, but the electric field contributions $E_{TU}$, $E_{TL}$, $E_F$, and $E_H$ are unknown. In other words, Equations (1) and (2) are a system of two equations with four unknowns, which is an underdetermined system of equations. As a result, the electric fields $E_F$ and $E_H$ associated with the swell noise cannot be calculated directly from Equations (1) and (2), and therefore, cannot be filtered from the electric field data. The number of unknowns in Equations (1) and (2) can be reduced from four unknowns to three unknowns using physical properties of the swell noise and the electric field output from the source 104 as follows:

Consider first the depth variation of the swell noise, which can be large when compared with the electric field output from the source 104. An estimate of the electric field generated by swells can be represented mathematically by:

$$\vec{E} = v \times \vec{B} \quad (3)$$

where
E represents the electric field of a swell at different depths,
v denotes the vertical velocity of a swell, and
$\vec{B}$ denotes the direction of the magnetic field associated with the swell.

The vertical velocity of a swell can be approximated by:

$$v = \omega A e^{-kz}$$

where
$k = \omega^2/g$ is the wavenumber;
A is the swell amplitude at the free surface;
$\omega$ is the swell angular frequency; and
g is a constant with an average magnitude of 9.82 meters/second$^2$.

Figure 4:
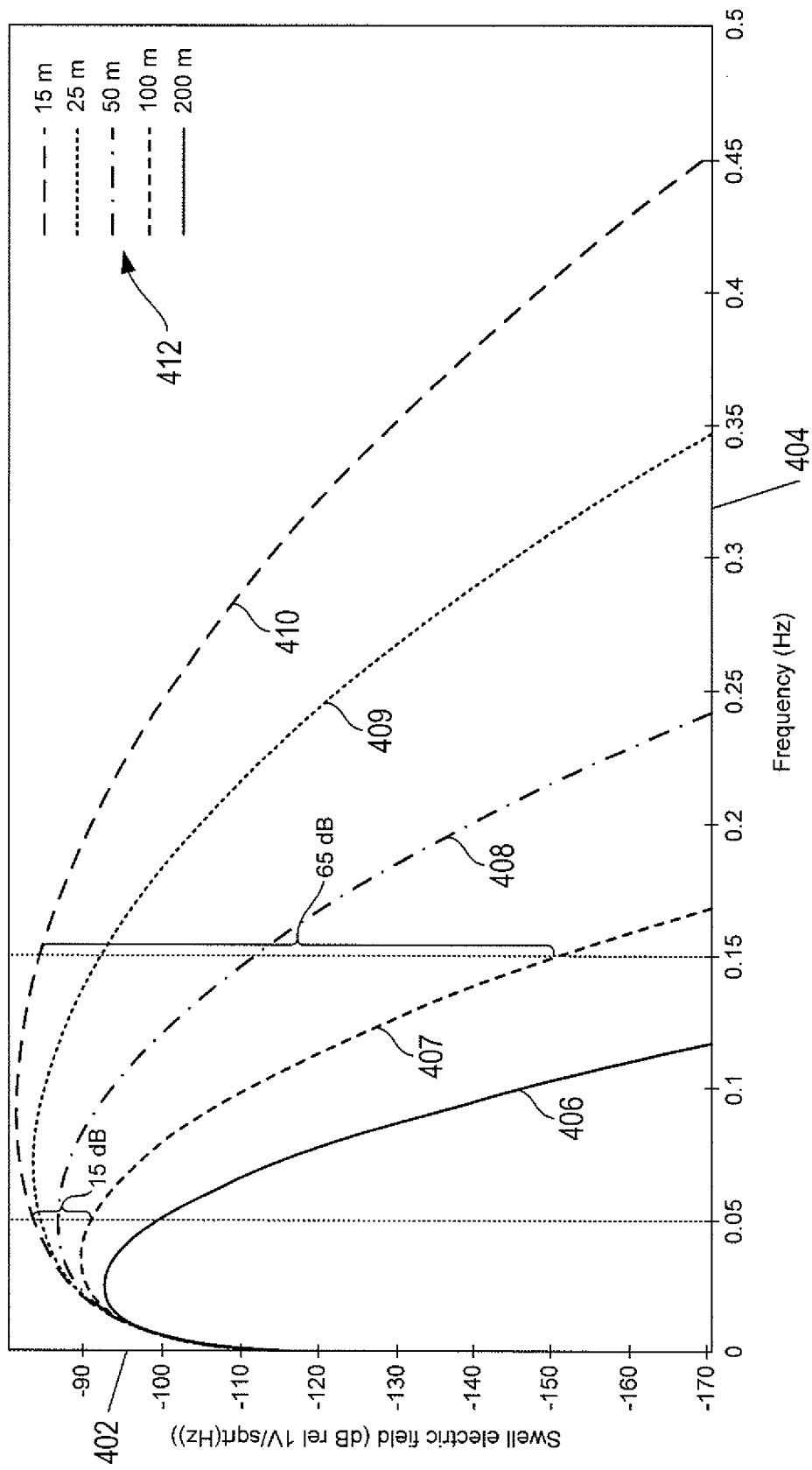
FIG. 4 shows a plot of estimated swell-generated electric fields at different depths versus a range of frequencies.

FIG. 4 shows a plot of estimated swell-generated electric fields at different depths versus a range of frequencies. Vertical axis 402 represents the swell electric field, and horizontal axis 404 represents a low frequency range from 0 Hz to 0.5 Hz. Each of the differently patterned curves 406-410 represents the swell electric field over the frequency range at the depths represented in legend 412. The curves 406-410 were generated using Equation (3) for a swell amplitude of 1 meter, depths ranging from 15-200 meters, a magnetic field of $|\vec{B}|=50$ µT, and a recording time of 100 seconds which contributes a per-root-Hz conversion factor of $\sqrt{100}$. The curves 406-410 have swell noise peaks centered around a range of frequencies 0.02-0.03 Hz. The curves 406-410 also reveal that for low frequencies below approximately 0.1 Hz, variation in the swell noise is smaller than swell noise variations associated with higher frequencies. For example, at approximately 0.05 Hz, the variation in swell noise for depths ranging from 15 to 100 meters is approximately 15 dB. By contrast, at approximately 0.15 Hz, the variation in swell noise for depths ranging from 15 to 100 meters is approximately 65 dB. Note that although the curves 406-410 represent overestimates of the swell noise when compared to actual measured values for the swell noise, the curves 406-410 still provide a reasonably good estimate as to how the swell noise varies with depth and frequency and demonstrate that for low frequencies, the electric field of the swell noise $E_F$ measured at the upper receiver 306 is proportional to the electric field of the swell noise $E_H$ measured at the lower receiver 310. In other words, the electric fields $E_F$ and $E_H$ are related by a proportionality parameter $\alpha$ as follows:

$$E_F = \alpha E_H \quad (4)$$

Figure 5:
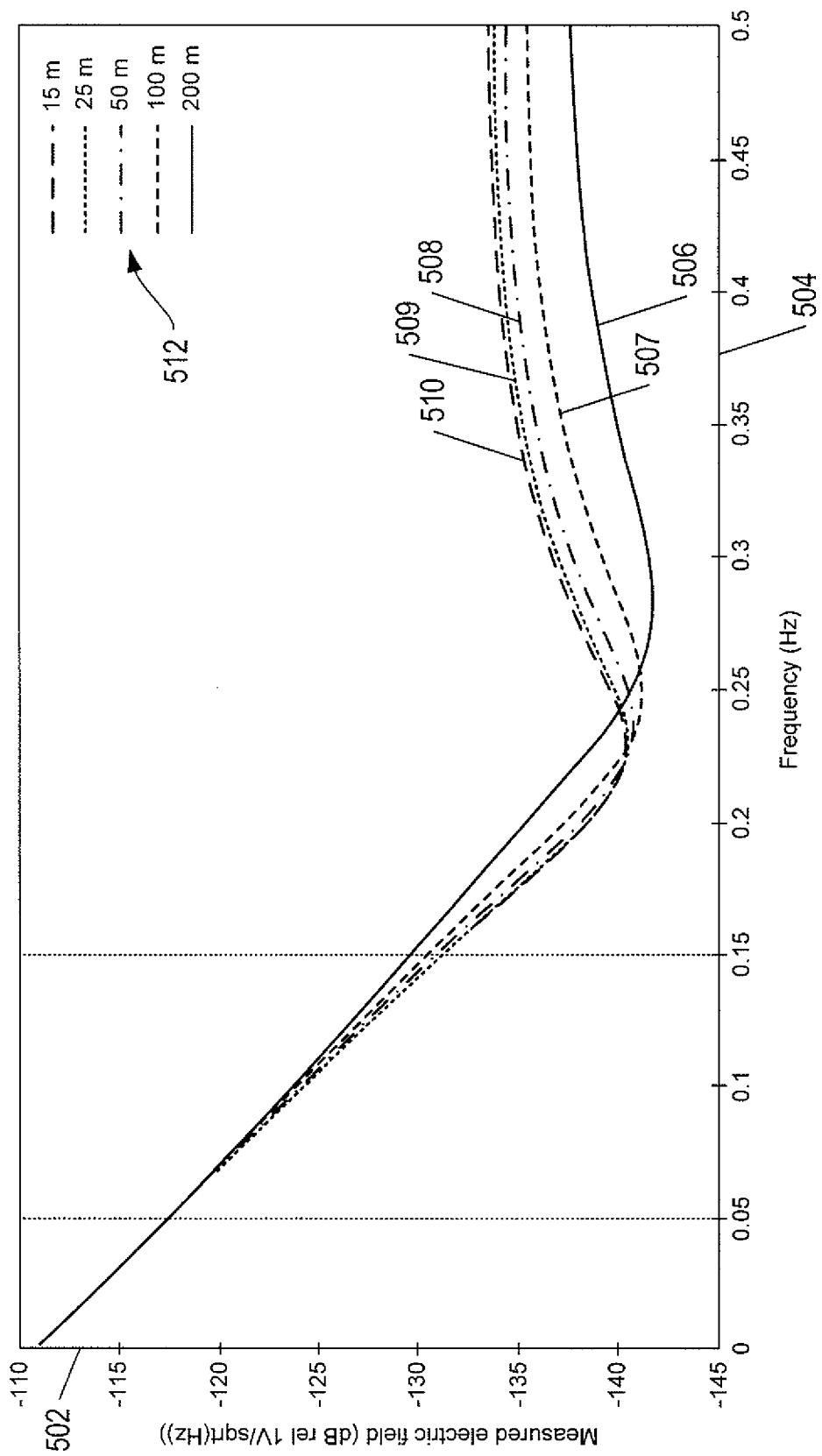
FIG. 5 show a plot of estimated measured electric fields output from a dipole source at different depths versus a range of frequencies.

FIG. 5 show a plot of estimated measured electric fields output from the source 104 at different depths versus a range of frequencies. Vertical axis 502 represents the swell electric field, and horizontal axis 504 represents a low frequency range from 0 Hz to 0.5 Hz. Each of the differently patterned curves 506-510 represents an estimated amplitude output from the source 104 over the frequency range at the depths represented in legend 512. The curves 506-510 were generated using the Green3D software package, provided by the University of Utah CEMI consortium at http://www.cemi.utah.edu/softlindex.html, with the following acquisition settings: water conductivity at 400 meter depth was 3.3 Siemens/meter; sediment conductivity was 0.4 Siemens/meter; target depth was 1400 meters; thickness was 100 meters; conductivity was 0.01 Siemens/meter; an 800 meter long source with a 1500 ampere electric current; and a receiver located at 7400 meters offset from the source. The curves 506-510 reveal that for low frequencies, such as frequencies less than 0.25 Hz, the electric field output from the source 104 varies little between approximately 15 meters and 200 meters. For example, the variation in the measured electric field at approximately 0.15 Hz is approximately zero, and at 0.15 Hz, the amplitude varies only by a few decibels. The curves 506-510 demonstrate that the difference between the electric field measured at the upper receiver, $E_{TU}$, and the electric field measured at the lower receiver, $E_{TL}$, is small. In other words, the results of FIG. 5 indicate that electric fields measured at vertically aligned upper and lower receivers are approximately the same:

$$E_{TU} \approx E_{TL} = E_T \quad (5)$$

where $E_T$ represents the electric field of the primary electromagnetic field output from the source 104.

Substituting the results given in Equations (4) and (5) into Equations (1) and (2) reduces the measured electric fields $E_U$ and $E_L$ to two linear functions of the electric field, $E_T$, and the swell noise measured at the lower receiver 310, $E_H$:

$$E_U = E_T + \alpha E_H \quad (6)$$

$$E_L = E_T + E_H \quad (7)$$

Using physical properties of the swell noise and the electric field output from the source 104, Equations (6) and (7) now represent the measured electric fields as a linear system of two equations with three unknowns. In other words, Equations (1) and (2) have been reduced from a system of two equations with four unknowns to a system of two equations with three unknowns given by Equations (6) and (7), respectively. Although Equations (6) and (7) are underdetermined, computational methods and systems described below are directed to determining the proportionality parameter α in the time domain and the frequency domain. Once the proportionality parameter α is determined for measured values of the electric fields $E_U$ and $E_L$, Equations (6) and (7) are reduced to two equations with two unknowns, which can be solved for the swell noise $E_N$, $E_F$, and the electric field $E_T$.

The proportionality parameter α can be determined by adjusting the way in which the electric field is output from the source for a period of time, called the conditioning period, while the receivers are measuring and recording electric fields. How the source is operated during the conditioning period depends on whether or not the proportionality parameter α is being calculated in the time domain or the frequency domain as described below in separate subsections. The conditioning period can be a portion of a time interval in which a survey vessel travels a ship track to survey a subterranean formation. The remaining portion of the time interval is called the "survey period" in which the source is operated normally and electric field data is collected and used to analyze a subterranean formation. The proportionality parameter determined from electric field measurements in the conditioning period can be used to substantially remove swell noise from the electric field data collected during the survey period.

Figure 6A:
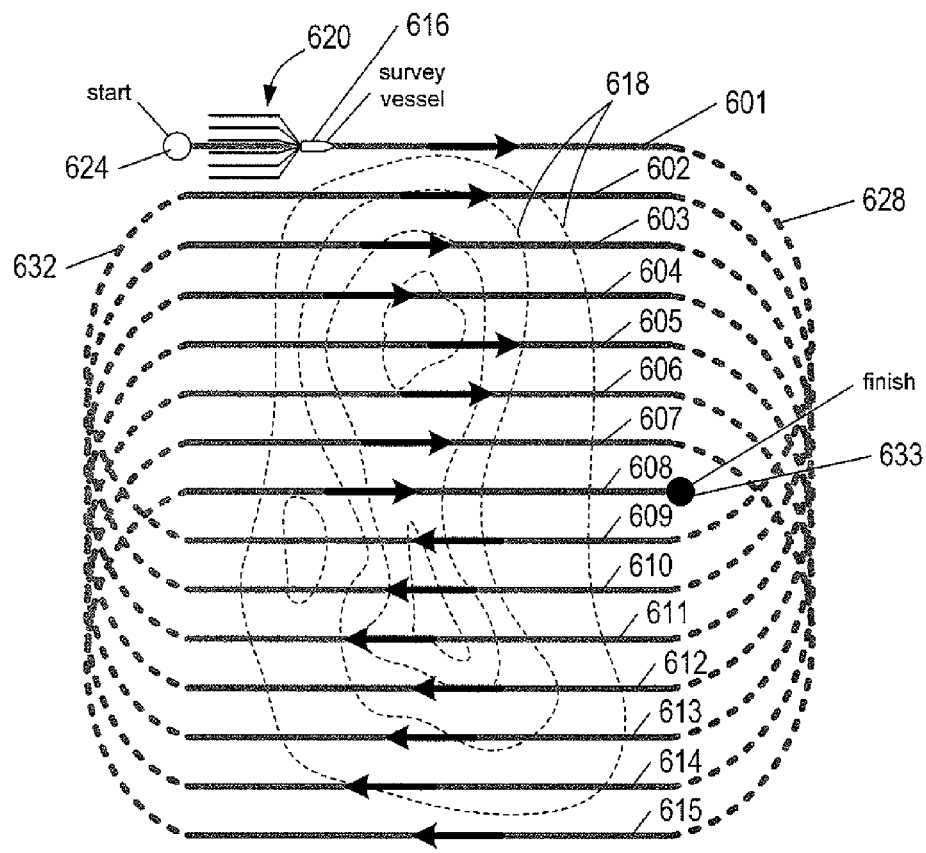
FIG. 6A shows a top view of example ship tracks a survey vessel follows in performing a survey of a subterranean formation.

FIG. 6A shows a top view of example straight tracks 601-615 a survey vessel 616 typically follows in performing a survey of a subterranean formation and represents corresponding conditioning periods in which proportionality parameters are determined. In FIG. 6, dashed line shapes 618 represent topographic contour lines of a geological formation located beneath a body of water. A subterranean formation to be surveyed for a hydrocarbon deposit is located beneath the geological formation. The parallel tracks 601-615 represent ideally straight parallel paths along which the survey vessel 616 tows a set of streamers 620 and a source (not shown). The streamers 620 can be two sets of upper and lower corresponding streamers with vertical corresponding receivers that form a three-dimensional data acquisition volume, as described above with reference to FIG. 1. When the streamers 620 comprises only one upper streamer and one lower streamer, the survey of the subterranean formation is called a two-dimensional survey, and when the streamers 620 comprises two or more upper and two or more lower vertically aligned streamers, the survey of the subterranean form is called a three-dimensional survey. The source (not shown) can be an electric dipole transmission antenna described above with reference to FIG. 1. Directional arrows, such as directional arrow 622, represent the direction the survey vessel 616 travels along the tracks. In FIG. 6, the survey begins a start point 624. The survey vessel 616 records the electric field measured by the receivers as the survey vessel 616 travels along the track 601. When the survey vessel reaches the end 626 of the track 601, the survey vessel 616 stops measuring and recording the electric field and follows the path represented by arc 628 to the track 609. The survey vessel 616 then measures and records the electric field along the track 609 in the opposite direction 622. At the end 630 of the track 609, the survey vessel 616 again stops measuring and recording the electric field and follows the path 632 to the track 602 where the survey vessel 616 measures and records the electric field along the track 602. The survey vessel 616 continues this pattern of measuring and recording the electric field along each of the tracks 601-615 until the survey vessel 616 reaches a finish point 633 located at the end of the track 608.

The straight line tracks 601-615 shown in FIG. 6A represent an example of ideal straight paths to be travelled by a survey vessel. In practice, however, a typical survey vessel is subject to shifting currents, winds, and tides and may only be able to travel approximately parallel straight line tracks. In addition, the streamers towed behind a survey vessel may not be towed directly behind the survey vessel because the streamers are subject to the same changing conditions as the vessel. As a result, the streamers may deviate laterally from the track the survey vessel travels in a process called "feathering."

It should also be noted that ship tracks are not restricted to straight-line ship tracks described above with reference to FIG. 6A. Ship tracks can be curved or circular or be any other suitable non-linear path. For example, in coil shooting surveys, a survey vessel travel in a series of overlapping, continuously linked circular, or coiled, ship tracks. The circular shooting geometry acquires a full range of offset data across every azimuth to sample the subsurface geology in all directions. The resulting full azimuth seismic data are used to image complex geology, such as highly faulted strata, basalt, carbonate reefs and subsalt formations. As a result, the terms "conditioning period" are not limited to a portion of a straight line track. The terms "conditioning period" can be used to refer to any segment or portion of a time interval in one or more linear or non-linear ship tracks. For example, the conditioning period can be used to refer to a portion of a time interval taken by a survey vessel to travel one or more overlapping circular or curved ship tracks in a coiled shooting survey. Alternatively, the survey track during the conditioning period can be substantially perpendicular to the survey track during the survey period.

Figure 6B:
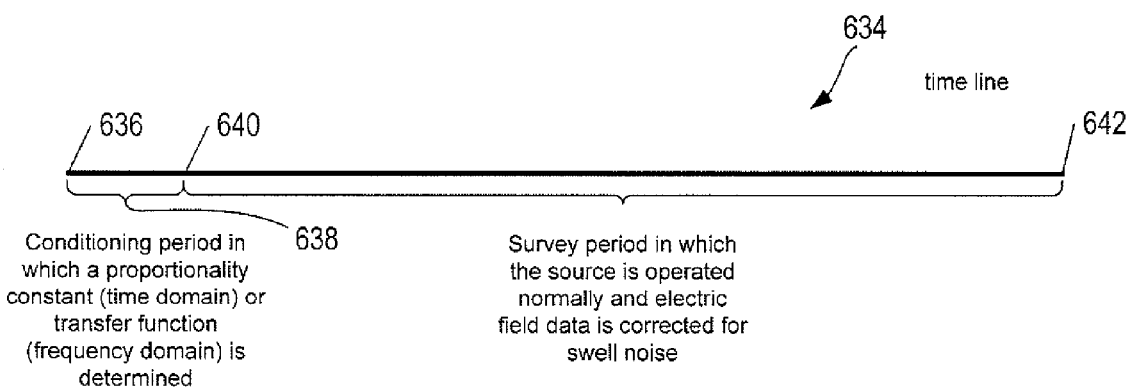
FIG. 6B shows a time axis that represents to the total time it takes for a survey vessel to travel a ship track.

A conditioning period can be a portion of the total time it takes the survey vessel 616 to travel one of the tracks 601-615. FIG. 6B includes a time axis 634 that represents to the total time it takes for the survey vessel 616 to travel along one of the tracks 601-615 show in FIG. 6A. A point 636 represents a start time at which the survey vessel 616 begins to travel along a track and begins measuring and recording the electric fields at upper and lower receivers of the streamers 620. The period of time 638 between the start time 636 and a later time represented by a point 640 is an example of a conditioning period in which the source is operated in a manner that enables the proportionality parameter α to be determined from electric field data collected during the conditioning period, as described in the next two subsections. At the time 640, the source begins normal operations for surveying the subterranean formation until the survey vessel 612 reaches the end of the track which occurs at the time represented by point 642. The period of time between the time 640 and the end time 642 is an example of a survey period. The upper and lower electric field data measured in the survey period can be corrected for swell noise in the time domain or the frequency domain using the proportionality parameter α calculated in the conditioning period. The conditioning period is not limited to the beginning of a track. In practice, the conditioning period can begin anywhere along the time axis 634.

A proportionality parameter α can be determined for each ship track of a survey. For example, a proportionality parameter can be determined for each of the ship tracks 601-615. Alternatively, a proportionality parameter can be determined along one of the tracks and used to substantially remove for swell noise from the electric field data measured in the same track and in neighboring tracks. For example, separate proportionality parameters can be determined for the tracks 602, 605, 608, 611, and 614, and the proportionality parameters determined for each of these tracks can be used to substantially remove swell noise from the measured electric field data associated with the tracks 602, 605, 608, 611 and 613 and the two tracks that neighbor each of these tracks. In other words, a survey period can be the time associated with more than one ship track for which a proportionality parameter is used to substantially remove swell noise from the electric field data. For example, the proportionality parameter determined for the track 602 can be used to remove swell noise from the electric field data measured in the tracks 601-603.

A. The Time Domain

As described above, the upper and lower receivers measure the electric field and produce corresponding continuous time and amplitude signals that are time sampled to produce corresponding discrete time and discrete amplitude signals. The system of Equations (6) and (7) can be represented in the discrete-time domain as:

$$E_U(t_n) = E_T(t_n) + \alpha(t_n) E_H(t_n) \qquad (8)$$

$$E_L(t_n) = E_T(t_n) + E_H(t_n) \qquad (9)$$

where $E_U(t_n)$ is a real-value, time-domain signal amplitude measured at an upper receiver;

$E_L(t_n)$ is a real-value, time-domain signal amplitude measured at a lower receiver that is substantially vertically aligned with the upper receiver;

$E_T(t_n)$ represents the electric field contribution to the time-domain signal amplitudes;

$E_H(t_n)$ represents the swell noise contribution to the time-domain signal amplitudes;

$\alpha(t_n)$ is a time domain proportionality function;

n=1, 2, ... N, with N the number of time samples in a conditioning period; and $t_n$ is the nth time sample in the conditioning period.

The sampling instants are separated by approximately the time sampling interval, and the signal amplitudes $E_U(t_n)$ and $E_L(t_n)$ are recorded for each time sampling instant $t_n$. It should be noted that in Equation (8), the proportionality parameter α of Equation (6) has been replaced by the time-domain proportionality function $\alpha(t_n)$, which is used as described below to calculate a time-domain proportionality constant α'. In order to determine the time-domain proportionality constant α', a source is turned "off" during the conditioning period, while the upper and lower receivers continue to measure the electric field. During the conditioning period in which the source 104 is turned "off," $E_T(t_n)=0$ and Equations (8) and (9) are reduced to $$E_U(t_n) = \alpha(t_n) E_H(t_n) \qquad (10)$$

$$E_L(t_n) = E_H(t_n) \qquad (11)$$

Substituting Equation (11) into Equation (10) gives the proportionality function:

$$\alpha(t_n) = \frac{E_U(t_n)}{E_L(t_n)} \qquad (12)$$

Equation (12) provides a mathematical model for determining the time-domain proportionality parameter in the conditioning period when the source 104 is turned "off."

The duration of the conditioning period is selected so that a sufficient number, N, of the signal amplitudes $E_U(t_n)$ and $E_L(t_n)$ with $E_T(t_n)=0$ are recorded and used to calculate a time-domain proportionality constant α'. In one embodiment, a time-domain proportionality constant can be determined from Equation (12) by computing an average of the proportionality function $\alpha(t_n)$ values in the conditioning period:

$$\alpha' = \frac{1}{N} \sum_{n=1}^{N} \alpha(t_n) = \frac{1}{N} \sum_{n=1}^{N} \frac{E_U(t_n)}{E_L(t_n)} \qquad (13)$$

Equation (12) represents the case where offset errors in the set of discrete time sample amplitudes $E_U(t_n)$ and $E_L(t_n)$ are small or non-existent. In practice, offset errors may be present in the discrete time sample amplitudes $E_U(t_n)$ and $E_L(t_n)$, which can be represented mathematically by:

$$E_U(t_n) = E_L(t_n) \alpha(t_n) + e_{offset} \qquad (14)$$

where $e_{offset}$ is the offset error between discrete time sample amplitudes $E_U(t_n)$ and $E_L(t_n)$.

When the offset error, $e_{offset}$, is greater than a threshold, the time-domain proportionality constant can be determined by calculating $$\min_{n \in M} |E_U(t_n) - E_L(t_n) \alpha(t_n) - e_{offset}| \qquad (15)$$

For example, Equation (15) can be minimized by solving a 2×2 system of equations:

$$\begin{bmatrix} \sum_{n=1}^{N} 1 & \sum_{n=1}^{N} E_L(t_n) \\ \sum_{n=1}^{N} E_L(t_n) & \sum_{n=1}^{N} E_L^2(t_n) \end{bmatrix} \begin{bmatrix} e_{offset} \\ \alpha' \end{bmatrix} = \begin{bmatrix} \sum_{n=1}^{N} E_U(t_n) \\ \sum_{n=1}^{N} E_U(t_n) E_L(t_n) \end{bmatrix} \quad (16)$$

In another embodiment, the system in Equation (16) can be solved for the time-domain proportionality constant given by:

$$\alpha' = \frac{N \sum_{n=1}^{N} E_U(t_n) E_L(t_n) - \sum_{n=1}^{N} E_L(t_n) \sum_{n=0}^{N} E_U(t_n)}{N \sum_{n=1}^{N} E_L^2(t_n) - \left(\sum_{n=1}^{N} E_L(t_n)\right)^2} \quad (17)$$

The time-domain proportionality constant $\alpha$ calculated in either Equation (13) or Equation (17) can then be substituted into the system of Equations (8) and (9) to give:

$$E_U(t_r) = E_T(t_r) + \alpha' E_H(t_r) \quad (18)$$

$$E_L(t_r) = E_T(t_r) + E_H(t_r) \quad (19)$$

where $t_r$ is a time sample in a survey period.

Equations (18) and (19) form a system of two equations with two unknowns that can be used to calculate the swell noise at a lower receiver:

$$E_H(t_r) = \frac{E_U(t_r) - E_L(t_r)}{\alpha' - 1} \quad (20)$$

The time-domain proportionality constant $\alpha$ and the swell noise $E_H$ can be used to calculate the swell noise at the upper receiver using Equation (4):

$$E_F(t_r) = \alpha' E_H(t_r) \quad (21)$$

The swell noise calculated in Equations (20) and (21) can be subtracted from the electric fields measured at vertically aligned upper and lower receivers to obtain swell-noise-corrected, electric fields at the upper and lower receivers:

$$E_U^{corr}(t_r) = E_U(t_r) - E_F(t_r) \quad (22)$$

$$E_L^{corr}(t_r) = E_L(t_r) - E_H(t_r) \quad (23)$$

B. The Frequency Domain

By transforming measured upper and lower signal amplitudes $E_U(t_n)$ and $E_L(t_n)$ from the time domain to the frequency domain, operation of the source is not limited to being turned "off" in the conditioning period in order to determine the proportionality parameter $\alpha$. In should be noted that in the time domain, the proportionality parameter is formulated in terms of a proportionality function $\alpha(t_n)$ that is ultimately reduced to a time-domain proportionality constant $\alpha'$ as described above in Equations (13) and (17). However, in the frequency domain, the proportionality parameter $\alpha$ is formulated in terms of a proportionality transfer function $\overline{\alpha}$ that is not reduced to a frequency-domain proportionality constant. In order to formulate the proportionality parameter as a proportionality transfer function $\overline{\alpha}$ in the frequency domain, upper and lower signals $E_U(t_n)$ and $E_L(t_n)$ given Equations (8) and (9) can be transformed from the time domain to the frequency domain by applying a Fourier transform:

$$\overline{E}_U(f_m) = \sum_{n=1}^{N} E_U(t_n) e^{-j f_m t_n}$$

$$\overline{E}_L(f_m) = \sum_{n=1}^{N} E_L(t_n) e^{-j f_m t_n}$$

where $\overline{E}_U(f_m)$ is a frequency-domain signal amplitude (real or complex) that corresponds to an upper receiver;

$\overline{E}_L(f_m)$ is a frequency-domain signal amplitude (real or complex) that corresponds to a lower receiver that is substantially vertically aligned with the upper receiver;

m=1, 2, ..., N;

$f_m$ is the mth frequency in the frequency domain; and j is the imaginary unit $\sqrt{-1}$.

Transformation of signal amplitudes in Equation (8) and (9) from the time domain to the frequency domain give:

$$\overline{E}_U(f_m) = \overline{E}_T(f_m) + \overline{\alpha}(f_m) \overline{E}_H(f_m) \quad (24)$$

$$\overline{E}_L(f_m) = \overline{E}_T(f_m) + \overline{E}_H(f_m) \quad (25)$$

where $\overline{\alpha}(f_m)$ is the proportionality transfer function. In practice, the transformation from the time domain to the frequency domain can be accomplished using a Fast Fourier transform for computational speed and efficiency. The frequency-domain signal amplitudes $\overline{E}_U(f_m)$ and $\overline{E}_L(f_m)$ are recorded for each discrete frequency $f_m$ and are separated in the frequency domain by the same frequency interval.

Like the time-domain proportionality function $\alpha(t_n)$ given in Equations (8) and (9), the frequency-domain proportionality transfer function $\overline{\alpha}(f_m)$ can be determined when $\overline{E}_T(f_m)=0$, which reduces Equations (24) and (25) to $$\overline{E}_U(f_m) = \overline{\alpha}(f_m) \overline{E}_H(f_m) \quad (26)$$

$$\overline{E}_L(f_m) = \overline{E}_H(f_m) \quad (27)$$

Substituting Equation (27) into Equation (26) gives:

$$\overline{\alpha}(f_m) = \frac{\overline{E}_U(f_m)}{\overline{E}_L(f_m)} \quad (28)$$

The proportionality transfer function $\overline{\alpha}(f_m)$ can be complex or real valued. Note that by formulating the proportionality parameter as a proportionality transfer function, the proportionality transfer function is calculated for frequency $f_m$ and appropriate amplitude and phase adjustments can be made in the frequency domain. In addition, offset errors in the frequency domain are handled differently than in the time domain. If offset errors are present, then the transformed amplitudes have a non-zero DC component at $f_m=0$ (i.e., $\overline{E}_U(f_m=0) \neq 0$ and $\overline{E}_L(f_m=0) \neq 0$). In other words, any offset errors are picked up in the DC component and the proportionality transfer function can be calculated from non-zero frequencies $f_m$.

In one embodiment, a proportionality transfer function $\overline{\alpha}(f_m)$ can be computed as follows. Like in the time domain, while the source is turned "off" during the conditioning period, the amplitudes $E_U(t_n)$ and $E_L(t_n)$ are recorded for N time sampling instants $t_n$, where n=1, 2, ..., N. The amplitudes $E_U(t_n)$ and $E_L(t_n)$ are then transformed from the time domain to the upper and lower signal amplitudes $\overline{E}_U(f_m)$ and $\overline{E}_L(f_m)$ in the frequency domain and the proportionality transfer function $\overline{\alpha}(f_m)$ is calculated for each $f_m$ as described in Equation (28).

Figure 7:
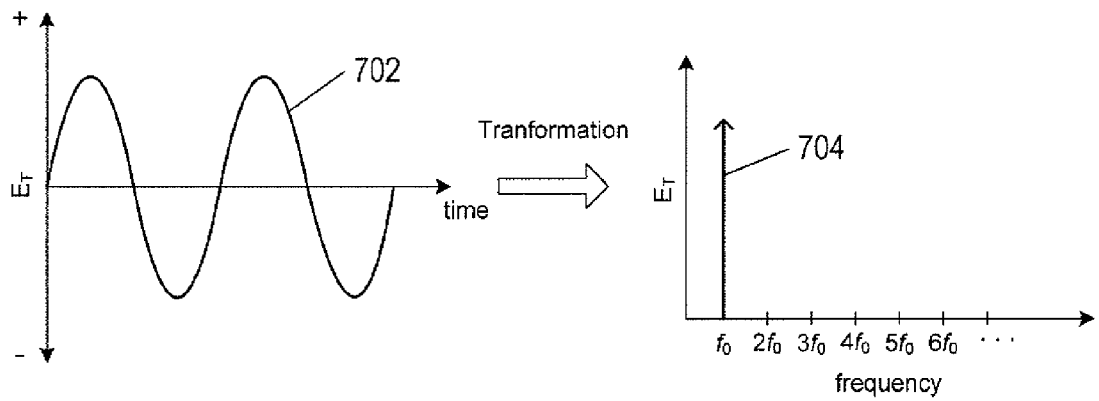
FIG. 7 shows a plot of an example sinusoidal curve that represents an electric field that oscillates with a regular frequency.

Embodiments for calculating a proportionality constant in the frequency domain are not limited to the source being turned "off" in the conditioning period. In other embodiments, a proportionality transfer function $\overline{\alpha}(f_m)$ can be calculated by operating the source in the conditioning period so that the electric field $E_T$ oscillates with a regular frequency of oscillation $f_0$. For example, the source can be supplied a sinusoidal current that causes the source to produce an electric field with an electric field $E_T$ that oscillates sinusoidally with a regular frequency of oscillation $f_0$. FIG. 7 shows a plot of an example sinusoidal curve 702 that represents an electric field $E_T$ that oscillates with a regular frequency $f_0$. FIG. 7 also shows a plot of the electric field transformed to the frequency domain, which corresponds to a single amplitude spike 704 at the frequency $f_0$. The example of FIG. 7 represents the case where the source is operated to produce an electric field with a sinusoidal oscillation frequency $f_0$ during the conditioning period. The resulting signal amplitude in the frequency domain is denoted by $\overline{E}_T(f_m) = \overline{E}_T(mf_0)$, where $\overline{E}_T(mf_0)$ is non-zero for $m$ equal to one, and is 0 for $m$ greater than one. As a result, for $m$ greater than one, the upper and lower signal amplitudes in the frequency domain are:

$$\overline{E}_U(mf_0) = \overline{\alpha}(mf_0)\overline{E}_H(mf_0) \qquad (31)$$

$$\overline{E}_L(mf_0) = \overline{E}_H(mf_0) \qquad (32)$$

In this case, the proportionality transfer function is given by:

$$\overline{E}_U(f_m) = \begin{cases} \overline{\alpha}(mf_0)\overline{E}_H(mf_0) & \text{for } m = m_{even} \\ \overline{E}_T(mf_0) + \overline{\alpha}(mf_0)\overline{E}_H(mf_0) & \text{for } m = m_{odd} \end{cases} \qquad (34)$$

$$\overline{E}_L(f_m) = \begin{cases} \overline{E}_H(mf_0) & \text{for } m = m_{even} \\ \overline{E}_T(mf_0) + \overline{E}_H(mf_0) & \text{for } m = m_{odd} \end{cases} \qquad (35)$$

Figure 8:
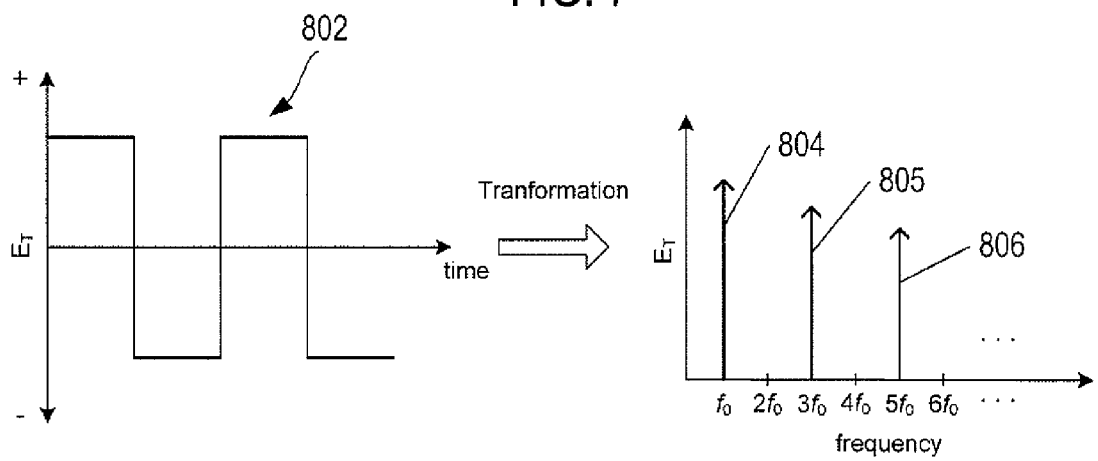
FIG. 8 also shows a frequency-domain plot of an electric field with a regular frequency of oscillation in the frequency domain.

In other embodiments, a frequency-domain proportionality constant $\alpha$ can be calculated by operating the source in the conditioning period so that the electric field $E_T$ has a square-wave oscillation with a regular frequency of oscillation $f_0$. For example, the direction of the current supplied to the source can be repeatedly switched back and forth during the conditioning period, which causes the source to produce an electric field amplitude $E_T$ characterized by a square wave with a frequency $f_0$. FIG. 8 shows a time-domain plot of a square wave 802 that represents an electric field $E_T$ produced by repeatedly switching the direction of the direct current applied to a source. FIG. 8 also shows a frequency-domain plot of the electric field amplitude $E_T$ in the frequency domain. Spikes 804-806 represent amplitudes of the electric field in the frequency domain. The amplitude $\overline{E}_T(f_m) = \overline{E}_T(mf_0)$ is non-zero for frequencies $f_m = m_{odd}f_0$, where $m_{odd}$ is an odd positive integer, and is zero for frequencies $f_m = m_{even}f_0$, where $m_{even}$ is a even positive integer. The upper and lower amplitude signals are:

$$\overline{\alpha}(f_m) = \frac{\overline{E}_U(mf_0)}{\overline{E}_L(mf_0)} \qquad (33)$$

Figure 9:
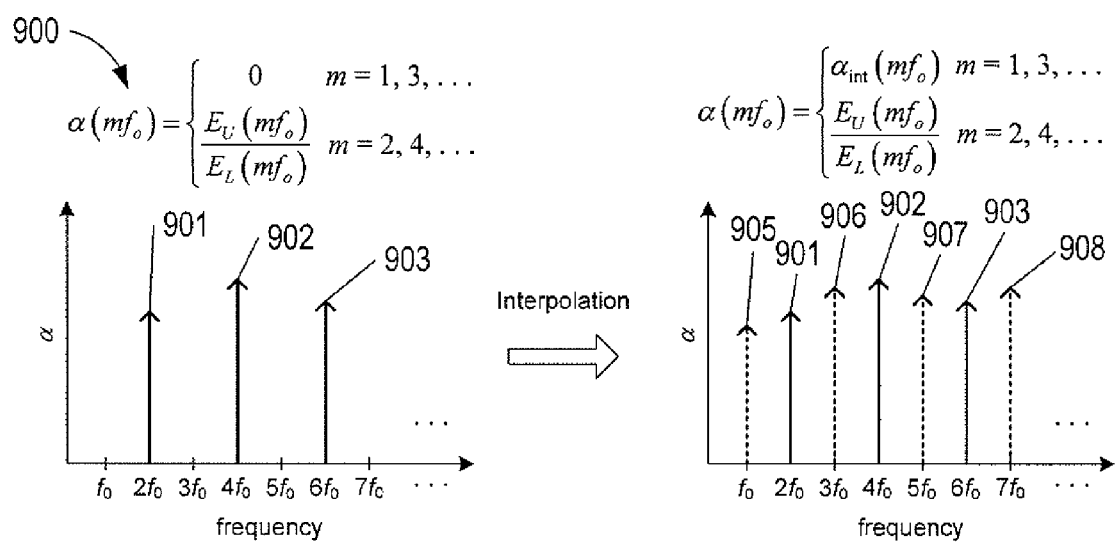
FIG. 9 shows a plot of an example frequency-domain proportionality parameter.

Thus, a frequency-domain proportionality function for $m = m_{even}$ is given by:

$$\overline{\alpha}(m_{even}f_0) = \frac{\overline{E}_U(m_{even}f_0)}{\overline{E}_L(m_{even}f_0)} \qquad (36)$$

and a frequency-domain proportionality function for $m = m_{odd}$ can be interpolated from $\overline{\alpha}(m_{even}f_0)$. FIG. 9 shows a plot of an example frequency-domain proportionality constant where only the proportionality constants corresponding to $m = m_{even}$ are represented by spikes 901-903. The proportionality constants corresponding to $m_{even}f_0$ can be used to interpolate proportionality function values $\overline{\alpha}_{int}$ for the frequencies $m_{odd}f_0$, which are represented in FIG. 9 by dashed-line spikes 905-908. As a result, a proportionality transfer function can be calculated by:

$$\overline{\alpha}(mf_0) = \begin{cases} \overline{\alpha}_{int}(m_{odd}f_0) & \text{for } m = m_{odd} \\ \overline{\alpha}(m_{even}f_0) & \text{for } m = m_{even} \end{cases} \qquad (37)$$

The proportionality transfer function $\overline{\alpha}$ can then be substituted into the system of Equations (24) and (25) to give:

$$\overline{E}_U(f_q) = \overline{E}_T(f_q) + \overline{\alpha}\overline{E}_H(f_q) \qquad (38)$$

$$\overline{E}_L(f_q) = \overline{E}_T(f_q) + \overline{E}_H(f_q) \qquad (39)$$

where
$f_q$ is a frequency in a portion of the frequency domain that corresponds to the survey period.

Equations (38) and (39) form a system of two equations with two unknowns that can be used to calculate the swell noise at a lower receiver:

$$\overline{E}_H(f_q) = \frac{\overline{E}_U(f_q) - \overline{E}_L(f_q)}{\overline{\alpha} - 1} \qquad (40)$$

The proportionality transfer function $\overline{\alpha}$ and the swell noise $\overline{E}_H$ can be used to calculate the swell noise at the upper receiver using Equation (4) as follows:

$$\overline{E}_F(f_q) = \overline{\alpha}\overline{E}_H(f_q) \qquad (41)$$

The swell noise calculated in Equations (40) and (41) can be subtracted from the electric fields measured at the upper and lower receivers to obtain frequency domain swell-noise-corrected, signal amplitudes:

$$\overline{E}_U^{corr}(f_q) = \overline{E}_U(f_q) - \overline{E}_F(f_q) \qquad (42)$$

$$\overline{E}_L^{corr}(f_q) = \overline{E}_L(f_q) - \overline{E}_H(f_q) \qquad (43)$$

The frequency-domain signal amplitudes given in Equations (40)-(43) can be transformed to the time domain using a fast inverse Fourier transform for computational speed and efficiency.

Figure 10:
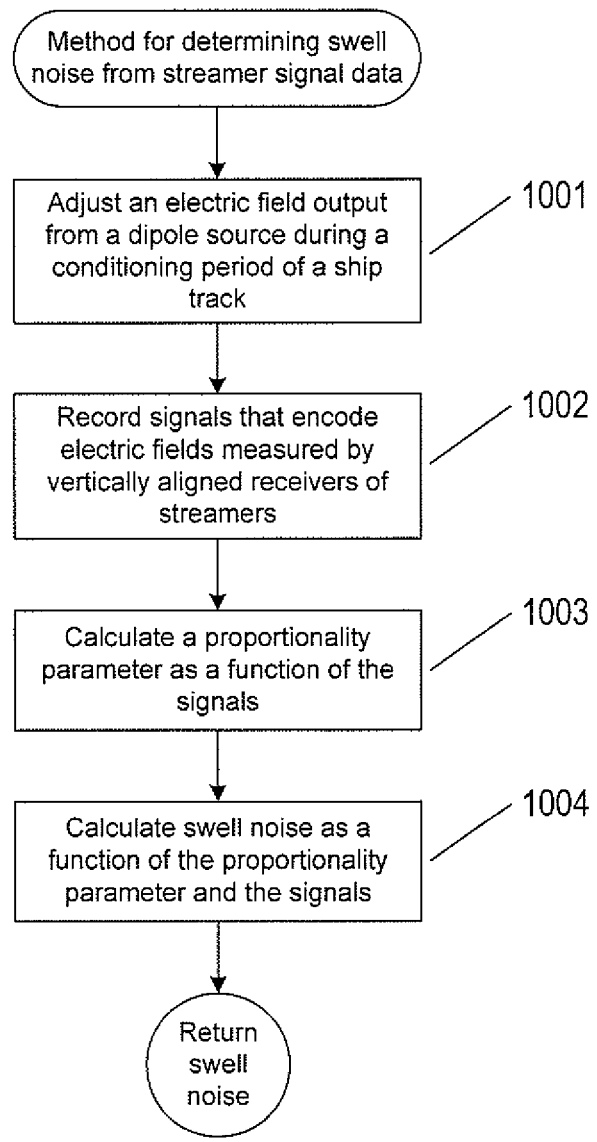
FIG. 10 shows a flow diagram of a method for measuring swell noise.

FIG. 10 shows a flow diagram of a method for determining swell noise from streamer signal data. In block 1001, a source, such as a dipole transmission antenna, described above with reference to FIG. 1, is towed behind a survey vessel traveling along a ship track and the source is operated to adjust output of an electric field during a conditioning period of a ship track. Adjustments applied to the source are determined by how the electric field data measured by receivers of streamers towed by the survey vessel are to be processed. When the electric field signal data is to be processed in the time domain, the source is turned "off" while electric field measurements are conducted during a conditioning period of the ship track, as described above. When the electric field signal data is to be processed in the frequency domain, the source can be turned "off" while electric field measurements are conducted during the conditioning period, or the source can be operated to generate an electric field that oscillates with a regular period of oscillation. In block 1002, signals that encode electric field data measured by vertically aligned receivers are recorded. In block 1003, a proportionality parameter is calculated as a function of the recorded signals. For example, when electric field signal data is to be processed in the time domain, Equations (13) or (17) can be used to calculate a proportionality parameter in the conditioning period. Alternatively, when electric field signal data is to be processed in the frequency domain, Equations (29), (30), (33), (34), (38), or (39) can be used to calculate a proportionality parameter in the conditioning period. In block 1004, swell noise is calculated as a function of the proportionality parameter and the recorded signals for electric field data in a survey period.

Figure 11:
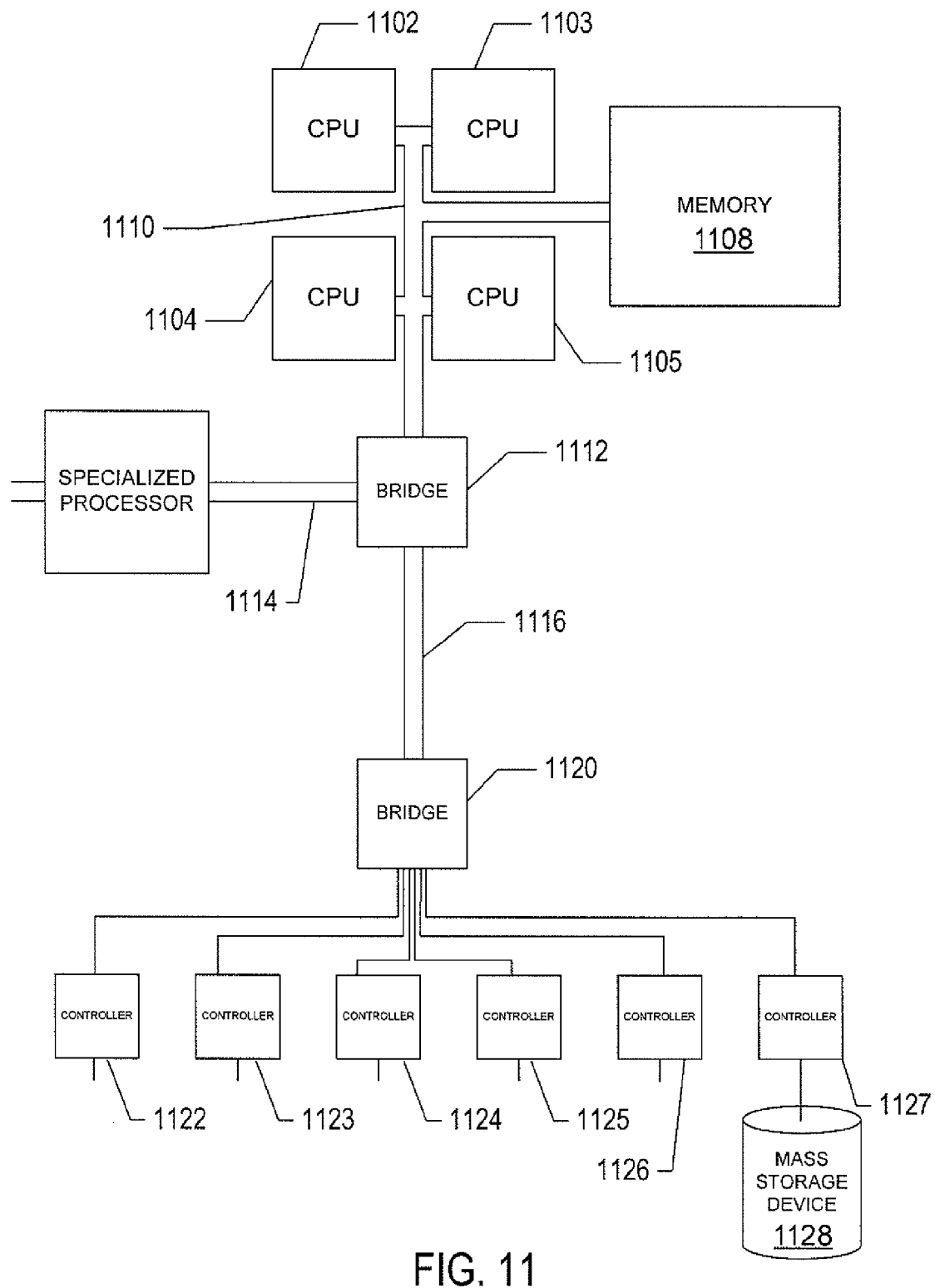
FIG. 11 shows an example of a generalized computer system that executes a method for determining swell noise from streamer signal data.

FIG. 11 shows an example of a generalized computer system that executes an efficient method for determining swell noise from streamer signal data and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1102-1105, one or more electronic memories 1108 interconnected with the CPUs by a CPU/memory-subsystem bus 1110 or multiple busses, a first bridge 1112 that interconnects the CPU/memory-subsystem bus 1110 with additional busses 1114 and 1116, or other types of high-speed interconnection media, including multiple, high-speed serial interconnects. The busses or serial interconnections, in turn, connect the CPUs and memory with specialized processors, such as a graphics processor 1118, and with one or more additional bridges 1120, which are interconnected with high-speed serial links or with multiple controllers 1122-1127, such as controller 1127, that provide access to various different types of computer-readable media, such as computer-readable medium 1128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1128 is a data-storage device, including electronic memory, optical or magnetic disk drive, USB drive, flash memory and other such data-storage device. The computer-readable medium 1128 can be used to store machine-readable instructions that encode the computational methods described above and can be used to store encoded data, during store operations, and from which encoded data can be retrieved, during read operations, by computer systems, data-storage systems, and peripheral devices.

Although the present invention has been described in terms of particular embodiments, it is not intended that the invention be limited to these embodiments. Modifications within the spirit of the invention will be apparent to those skilled in the art. For example, any number of different computational-processing-method implementations that carry the methods described above for determining swell noise may be designed and developed using various different programming languages and computer platforms and by varying different implementation parameters, including control structures, variables, data structures, modular organization, and other such parameters. The computational representations of wavefields, operators, and other computational objects may be implemented in different ways It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for determining swell noise, the method comprising:
towing substantially vertically aligned receivers and an electromagnetic source along a survey track;
adjusting an electromagnetic field to be output from the electromagnetic source during a conditioning period of the survey track;
receiving signals that encode electromagnetic field data measured by the vertically aligned receivers in the conditioning period;
calculating a proportionality parameter as a function of the signals;
calculating swell noise as a function of the proportionality parameter and signals that encode electromagnetic field data measured by the vertically aligned receivers during a survey period;
subtracting swell noise from the signals that encode electromagnetic field data to obtain swell-noise corrected signals; and
generating a geophysical image based at least in part on the swell-noise corrected signals.

2. The method of claim 1, wherein towing the receivers is accomplishing using a single survey vessel.

3. The method of claim 1, wherein the measured electromagnetic field data comprises electric field data.

4. The method of claim 1, wherein the survey track during the conditioning period is substantially perpendicular to the survey track during the survey period.

5. The method of claim 1, wherein the electromagnetic source is an electric dipole source.

6. The method of claim 1, wherein adjusting the dipole source further comprises turning the dipole source off for the duration of the conditioning period.

7. The method of claim 1, wherein adjusting the dipole source further comprises adjusting the dipole source to generate an electric field with a substantially regular frequency of oscillation for the duration of the conditioning period.

8. The method of claim 1, wherein the signals are time sampled signals.

9. The method of claim 1, wherein receiving signals further comprises
time sampling signals generated by the vertically aligned receivers; and transforming time-sampled signals to a frequency domain.

10. The method of claim 1, wherein calculating the proportionality parameter further comprises calculating an average of a first time-domain signal generated by an upper receiver divided by a second time-domain signal generated by a lower receiver, wherein the upper receiver and the lower receiver are vertically aligned receivers.

11. The method of claim 1, wherein calculating the proportionality parameter further comprises:
transforming a first time-domain signal generated by an upper receiver into a first frequency-domain signal;
transforming a second time-domain signal generated by a lower receiver into a second frequency-domain signal; and
calculating a proportionality transfer function as a function of the first frequency-domain signal divided by the second frequency-domain signal, wherein the upper receiver and the lower receiver are vertically aligned receivers.

12. A method for determining swell noise in signal data generated by receivers of upper and lower streamers towed by a survey vessel, the method comprising:
receiving a first signal associated with an upper receiver of the upper streamer and a second signal associated with a lower receiver of the lower streamer, the first signal and the second signal encode electromagnetic field data measured in a conditioning period of a ship track traveled by the survey vessel;
calculating a proportionality parameter as a function of the first signal and the second signal measured in the conditioning period;
calculating swell noise at the lower receiver as a function of the proportionality parameter and signals associated with the upper receiver and the lower receiver measured in a survey period;
calculating swell noise at the upper receiver as a product of the proportionality parameter and the swell noise at the lower receiver;
subtracting the swell noise at the lower receiver from the signals associated with a lower receivers to obtain swell-noise corrected signals at the lower receivers;
subtracting the swell noise at the upper receiver from the signals associated with upper receivers to obtain swell-noise corrected signals at the upper receivers; and
generating a geophysical image based at least in part on the swell-noise corrected lower and upper signals.

13. The method of claim 12, wherein the electromagnetic field data comprises electric field data.

14. The method of claim 12, wherein the survey track during the conditioning period is substantially perpendicular to the survey track during the survey period.

15. The method of claim 12, where the upper receiver is approximately vertically aligned with the lower receiver.

16. The method of claim 12, wherein the first signal is a discrete time-domain signal and the second signal is a discrete time-domain signal.

17. The method of claim 12, wherein the first signal is a discrete frequency-domain signal and the second signal is a discrete frequency-domain signal.

18. The method of claim 12, wherein when the first signal and the second signal are time-domain signals, calculating the proportionality parameter further comprises calculating an average of the first signal divided by the second signal for time samples in the conditioning period.

19. The method of claim 12, wherein when the first signal and the second signal are frequency-domain signals, calculating the proportionality parameter further comprises calculating a proportionality transfer function as a function of the first signal divided by the second signal in the frequency domain, wherein the first signal is a transformation of a signal generated by the upper receiver in the conditioning period and the second signal is a transformation of a signal generated by the lower receiver in the conditioning period.

20. A non-transitory computer-readable medium having machine-readable instruction encoded thereon to enable one or more processors of a computer system to perform the operations of
receiving a first signal associated with an upper receiver of the upper streamer and a second signal associated with a lower receiver of the lower streamer, the first signal and the second signal encode electromagnetic field data measured in a conditioning period of a ship track traveled by the survey vessel;
calculating a proportionality parameter as a function of the first signal and the second signal measured in the conditioning period;
calculating swell noise at the lower receiver as a function of the proportionality parameter and signals associated with the upper receiver and the lower receiver measured in a survey period;
calculating swell noise at the upper receiver as a product of the proportionality parameter and the swell noise at the lower receiver;
subtracting the swell noise at the lower receiver from the signals associated with a lower receivers to obtain swell-noise corrected signals at the lower receivers;
subtracting the swell noise at the upper receiver from the signals associated with upper receivers to obtain swell-noise corrected signals at the upper receivers; and
generating a geophysical image based at least in part on the swell-noise corrected lower and upper signals.

21. The method of claim 20, wherein the electromagnetic field data comprises electric field data.

22. The method of claim 20, wherein the survey track during the conditioning period is substantially perpendicular to the survey track during the survey period.

23. The medium of claim 20, where the upper receiver is approximately vertically aligned with the lower receiver.

24. The medium of claim 20, wherein the first signal is a discrete time-domain signal and the second signal is a discrete time-domain signal.

25. The medium of claim 20, wherein the first signal is a discrete frequency-domain signal and the second signal is a discrete frequency-domain signal.

26. The medium of claim 20, wherein when the first signal and the second signal are time-domain signals, calculating the proportionality parameter further comprises calculating an average of the first signal divided by the second signal for time samples in the conditioning period.

27. The medium of claim 20, wherein when the first signal and the second signal are frequency-domain signals, calculating the proportionality parameter farther comprises calculating a proportionality transfer function as a function of the first signal divided by the second signal in the frequency domain, wherein the first signal is a transformation of a signal generated by the upper receiver in the conditioning period and the second signal is a transformation of a signal generated by the lower receiver in the conditioning period.

\* \* \* \* \*